United States Patent
Flanders

(10) Patent No.: US 6,424,466 B1
(45) Date of Patent: Jul. 23, 2002

(54) DUAL CAVITY MEMS TUNABLE FABRY-PEROT FILTER

(75) Inventor: Dale C. Flanders, Lexington, MA (US)

(73) Assignee: Axsun Technologies, Inc, Billerica, MA (US)

(*) Notice: Subject to any disclaimer, the term of this patent is extended or adjusted under 35 U.S.C. 154(b) by 0 days.

(21) Appl. No.: 09/847,685

(22) Filed: May 2, 2001

(51) Int. Cl.7 .............................................. G02B 27/00
(52) U.S. Cl. ........................ 359/578; 356/454; 356/519
(58) Field of Search ................................ 359/578, 291, 359/320, 224; 356/454, 519

(56) References Cited

U.S. PATENT DOCUMENTS

| 4,553,816 A | 11/1985 | Durand et al. ............... 350/166 |
| 5,914,804 A | * 6/1999 | Goossen ...................... 359/291 |

FOREIGN PATENT DOCUMENTS

EP  0 933 657 A2  8/1999  ........... G02B/6/293

OTHER PUBLICATIONS

Hogeveen, Sake J.; and van de Stadt, Herman, "Fabry–Perot Interferometers with Three Mirrors," Applied Optics, vol. 25, No. 22, Nov. 15, 1986.

Jain, Anil K.; Stoltzmann, David E. Knowles, Gary R.; Droessler, Justin G.; and Johnson, Dean, "Dual Tunable Fabry–Perot Spectrally Agile Filter," Optical Engineering, vol. 23, No. 2, Mar./Apr. 1984.

Saleh, A.A. M.; and Stone, J., "Two–Stage Fabry–Perot Filters as Demultiplexers in Optical FDMA LAN's," Journal of Lightwave Technology, vol. 7, No. 2, Feb. 1989, pp. 323–330.

Stone, J.; Stulz, L. W.; and Saleh, A.A. M., "Three–Mirror Fibre Fabry–Perot Filters of Optimal Design," AT& T Bell Laboratories, Crawford Hill Laboratory, Holmdel, New Jersey, 07733, U.S.A.

van de Stadt, Herman; and Muller, Johan M., "Multimirror Fabry–Perot Interferometers," Optical Society of America, vol. 2, No. 8, Aug. 1985.

* cited by examiner

Primary Examiner—Cassandra Spyrou
Assistant Examiner—Alessandro V. Amari
(74) Attorney, Agent, or Firm—Grant Houston

(57) ABSTRACT

A multi-cavity micro-optical Fabry-Perot filter uses electrostatically deflected MEMS membranes. The filter comprises a first electrostatically deflectable membrane device. A curved mirror structure is formed on its optical membrane. Similarly, a second electro-statically deflectable membrane device is provided, which has a second curved mirror structure on the membrane. The spacer is used to separate the first membrane device from the second membrane device. The spacer supports a mirror between the first and second curved mirror structures. Wafer-level and device level assembly techniques are also described.

12 Claims, 8 Drawing Sheets

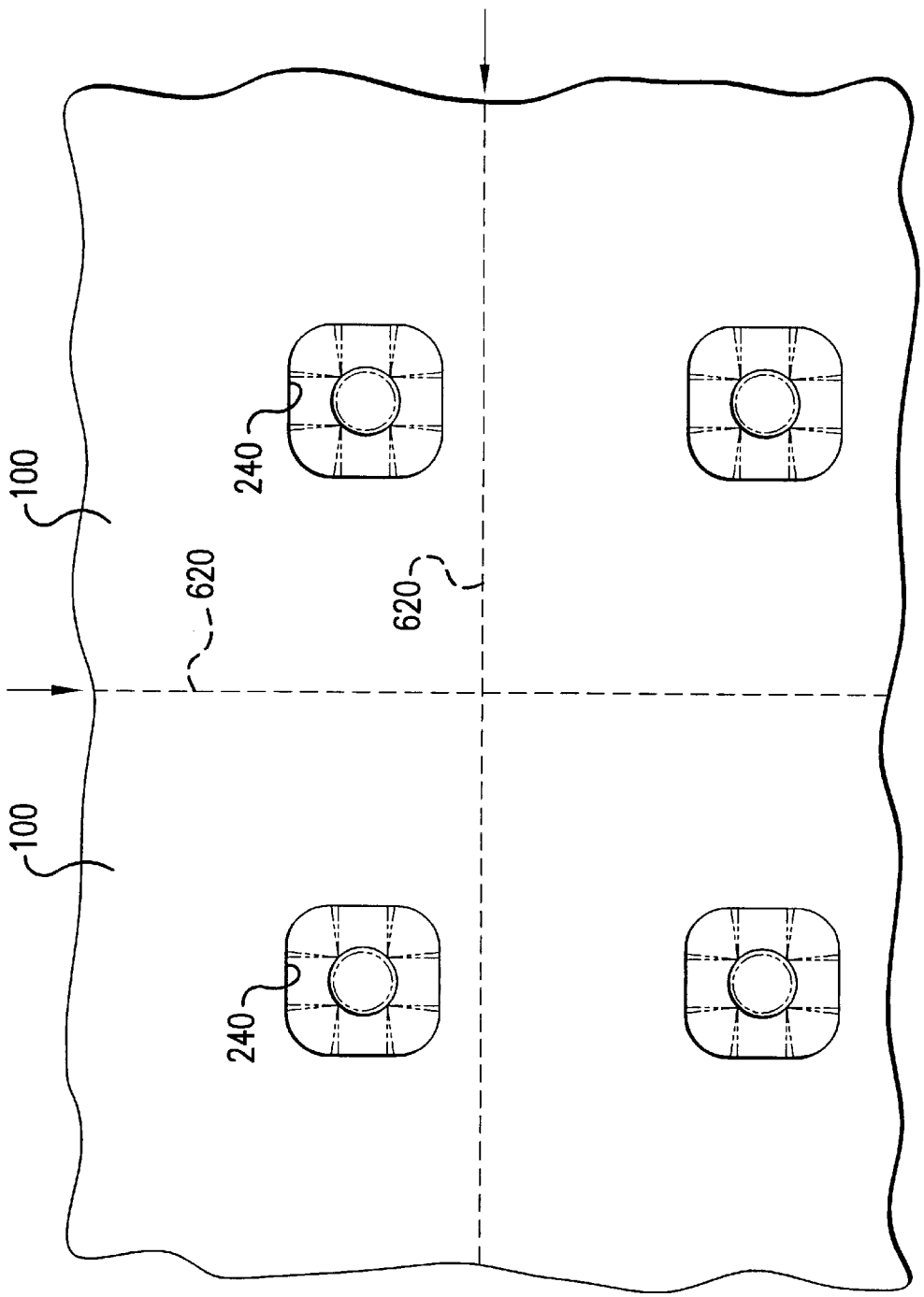

DUAL CAVITY MEMS TUNABLE FABRY-PEROT FILTER

BACKGROUND OF THE INVENTION

Single cavity Fabry-Perot (FP) tunable filters are commonly used in spectral monitoring applications. High finesse devices have impulse-like spectral filter functions that can be scanned across a band of interest in order to determine the spectral optical energy distribution.

One of the most common applications for FP filters is in wavelength division multiplexing (WDM) systems. In commercially available WDM systems, the channel assignments/spacings can be tight, 100 GigaHertz (GHz) to 50 GHz, based on the International Telecommunication Union (ITU) grid. Further, the number of potential channels, channel slots, in a link can be large. Observation of the ITU Grid suggests 100's of channels per link in the $L_\alpha$, $C_\alpha$, and $S_\alpha$, bands that stretch from about 1491 nanometers (nm) or 200 Terahertz (THz) to about 1612 nm or 186 THz. Additional channels in this range are provided by the 50 GHz offset of the $L_\beta$, $C_\beta$, and $S_\beta$ bands. Still other systems are being proposed that have assignments/spacings in the 10 to 20 GHz range. In each of these systems, the channels are confined to their channel slot or frequency assignment to an absolute accuracy of less than 10 GHz, in some cases. In order to verify the proper operation of these WDM systems, FP-based optical channel monitors are required with pass bands of 10 GHz and less.

When even sharper filter functions, i.e., smaller pass bands, are required, multiple Fabry-Perot filters can be deployed in a cascade configuration. Two cascaded filters effectively double the sharpness of the net filter function. Moreover, careful co-design of the two filter cavities can yield substantial improvements in the side mode suppression.

Expanding the applications for FP tunable filters, beyond the standard monitoring applications or to applications requiring narrowed passbands, requires effort in the design of a class of FP filters called multi-cavity FP tunable filters. These filters have multiple discrete coupled optical cavities. Selection of the mirror reflectivities for the end mirrors and the mirror separating the cavities, along with control over the cavity lengths, leads to the ability to provide filters that have controllable passband profiles during the design stage and dynamically during operation. Most commonly, the filters are designed to have a top-hat pass band profile, which can be used to selectively route single channels or blocks of contiguous channels in a fully or partially populated WDM signal.

SUMMARY OF THE INVENTION

Critical to the deployment of multi-cavity FP filters is the fabrication of microelectromechanical system (MEMS)/micro-optical electromechanical system (MOEMS) filter designs. In the past, macro-scale multi-cavity FP filters have been manufactured.

Generally, however, these devices do not have the form factor required for communications applications. Moreover, they typically lack mechanical robustness and have poorer performance. Smaller optical fiber-based multi-cavity FP filters have been proposed for communications applications. The drawbacks here are associated with the difficulties in depositing highly reflecting HR dielectric mirror coatings on the fiber ends and control of other cavity parameters such as end-mirror curvatures. Moreover, fiber-based cavity FP filters typically use piezoelectric-based actuators, which typically suffer from electromechanical instability.

The present invention is directed to a multi-cavity micro-optical Fabry-Perot filter. It uses electrostatically deflected MEMS membranes. Such devices can have excellent mechanical/optical characteristics.

In general, according to one aspect, the invention features a multi-cavity Fabry-Perot filter. The filter comprises a first electrostatically deflectable membrane device. A curved mirror structure is formed on its optical membrane. Similarly, a second electro-statically deflectable membrane device is provided, which has a second curved mirror structure on the membrane. The spacer is used to separate the first membrane device from the second membrane device. The spacer supports a mirror between the first and second curved mirror structures.

According to one embodiment, the first and second membrane devices each comprise a support, a device layer in which a deflectable membrane is formed, and a sacrificial layer, which separates the support from the device layer. The sacrificial layer is selectively removed to release the membrane.

An optically curved surface is formed on the deflectable membrane. Typically, the optical surface is a concave mirror with a continuous surface profile. In alternative embodiments, however, diffractive or Fresnel-type mirror profiles can be used. In order to provide the mirror structures, an optical coating is deposited on the optically curved surfaces of the membrane devices. The optical coating is typically a multi-layer dielectric mirror.

According to other aspects of the present embodiment, the spacer comprises two spacer layers between which a dielectric mirror layer is located. Regions of these first and second spacer layers are preferably removed surrounding an optical axis to thereby expose the dielectric mirror layer of the flat mirror to the device's optical cavities. This produces a suspended dielectric mirror in a region surrounding the optical axis of the filter.

In some embodiments, a support frame is provided around the spacer. This support frame is preferably integral with the spacer and defines one or two blind holes into which one or both of the membrane devices are installed. Thus, each membrane device is aligned using preferably lithographically-formed features of the support frame/spacer to thereby align the membrane devices relative to each other. In one embodiment, registration features are provided in at least one or both of the blind holes. The membrane devices are abutted against these features to yield a robust alignment system. Spring or biasing elements can also be fashioned in the support frame/spacer to ensure good abutment of the devices against these registration features.

In general, according to another aspect, the invention features a process for assembling multi-cavity Fabry-Perot filters. Generally, this process relies on the production of a precursor structure that will be subsequently singulated, by die sawing for example, into singulated filters. Typically, a first die of electrostatically membrane devices is attached to a first side of a spacer, which includes the flat mirror, followed by the attachment of a second die of electrostatically deflectable membrane devices to a second side of the spacer.

Preferably, to facilitate the die saw singulation, a perimeter around the membranes of the membrane devices is preferably sealed during the attachment or subsequent to the attachment of the dies to the spacer. Further, optical ports on the backsides of the dies are also preferably filled prior to the die saw operation. A good candidate for the fill material is a photoresist, which is later removed, after the sawing is complete, and any particulate matter washed away.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 8 s a plan view of the assembled membrane devices and spacer to thereby form a precursor structure that is ready for die saw singulation.

DETAILED DESCRIPTION OF THE PREFERRED EMBODIMENTS

Figure 1:
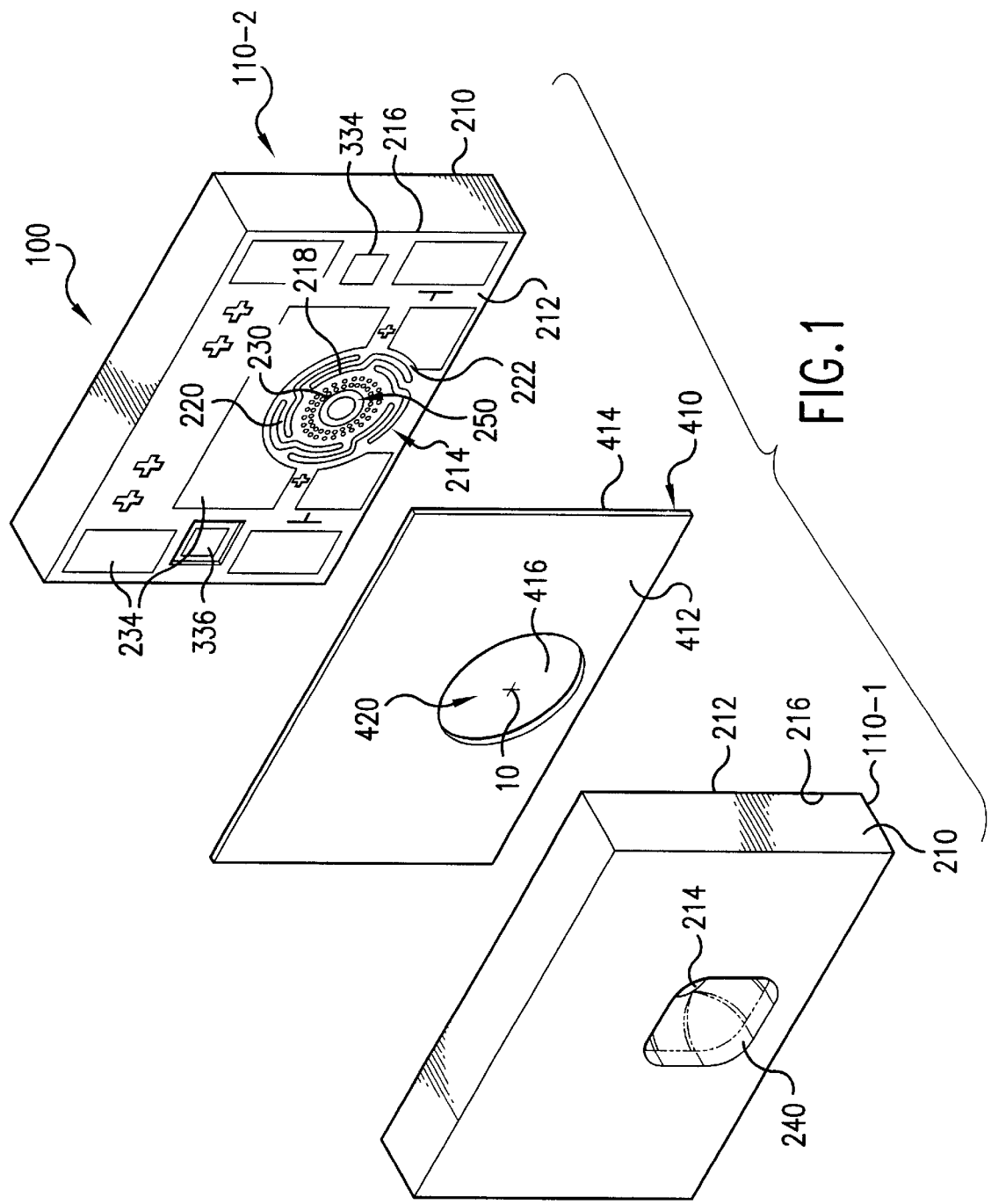
FIG. 1 is an exploded perspective view of the dual cavity Fabry-Perot tunable filter according o the present invention.

FIG. 1 shows a dual cavity Fabry-Perot (FP) tunable filter 100, which has been constructed according to the principles of the present invention.

Generally, the FP filter 100 comprises two membrane devices 110-1, 110-2. Each membrane device comprises a curved mirror structure 250, which is supported on a deflectable optical membrane 214. According to the preferred embodiment, the membrane 214 is electrostatically deflected to yield out-of-plane movement.

A spacer 410 is installed between the two membrane devices 110-1, 110-2. In the illustrated embodiment, this spacer 410 comprises two spacer layers 412, 414 that define the length of the two optical cavities. Sandwiched between the two spacer layers 412, 414 is a dielectric mirror layer 416.

In the illustrated embodiment, regions of the spacer layers 412 and 414 are removed surrounding the optical axis 10. This yields a suspended, dielectric, flat or relatively flat, mirror 420, which functions as the center mirror structure in the dual cavity Fabry-Perot filter 100.

One configuration, and associated fabrication technique, for the membrane devices 110 is described in U.S. Pat. appl. Ser. No. 09/804,618, filed on Mar. 12, 2001, entitled "MEMS Membrane with Integral Mirror/Lens", by Flanders, et al. This application is incorporated herein by this reference in its entirety.

Generally, as described in that application, each membrane device 110 comprises a support 210, which is typically manufactured from silicon handle wafer material. A device or membrane layer 212 is installed or deposited on the support 210 with an intervening sacrificial or release layer 216.

The release layer 216 also defines the electrostatic cavity between the membrane 214 and the support 210, in the illustrated implementation. Electrical access to the support 210 is provided by wire bond pad 336. Electrical access to the device layer 212 and thus the membrane 214 is provided via the device layer bond pad 334. Alternatively, electrical access to the device layer is obtained by a port through the backside of the support.

In the illustrated implementation of the membrane device 110, the MEMS release structure comprises a spiral pattern of tethers 220 that extend between an outer portion 222 of the membrane 214, which portion is supported by remnants of the sacrificial layer, and the membrane body 218. At the center of the membrane body 218 is the curved mirror structure, which generally comprises a reflective layer 230 that has been deposited over a curved surface 250, which has been fabricated in the membrane. The reflective layer 230 is preferably a dielectric mirror comprising multiple alternating high and low index thin film layers. The curved reflective optical surface or mirror structure 250 is provided in the center of the mirror layer 230. This curved optical surface is preferably a concave surface to thereby yield a mirror structure with a concave optical surface.

Surrounding the membrane 214 on the device layer 212 are metalizations 234. These are used in the bonding of the membrane device 210 to the spacer 410.

In the current implementation, the membrane devices 110-1, 110-2 are substantially identical to each other, as illustrated by the similar reference numerals. Thus, membrane device 110-1 illustrates the backside features of the membrane devices 110. Specifically, an optical port 240 is preferably etched through the backside of the membrane devices 110 thereby provide optical access to the backside of the membranes 214.

Figure 2:
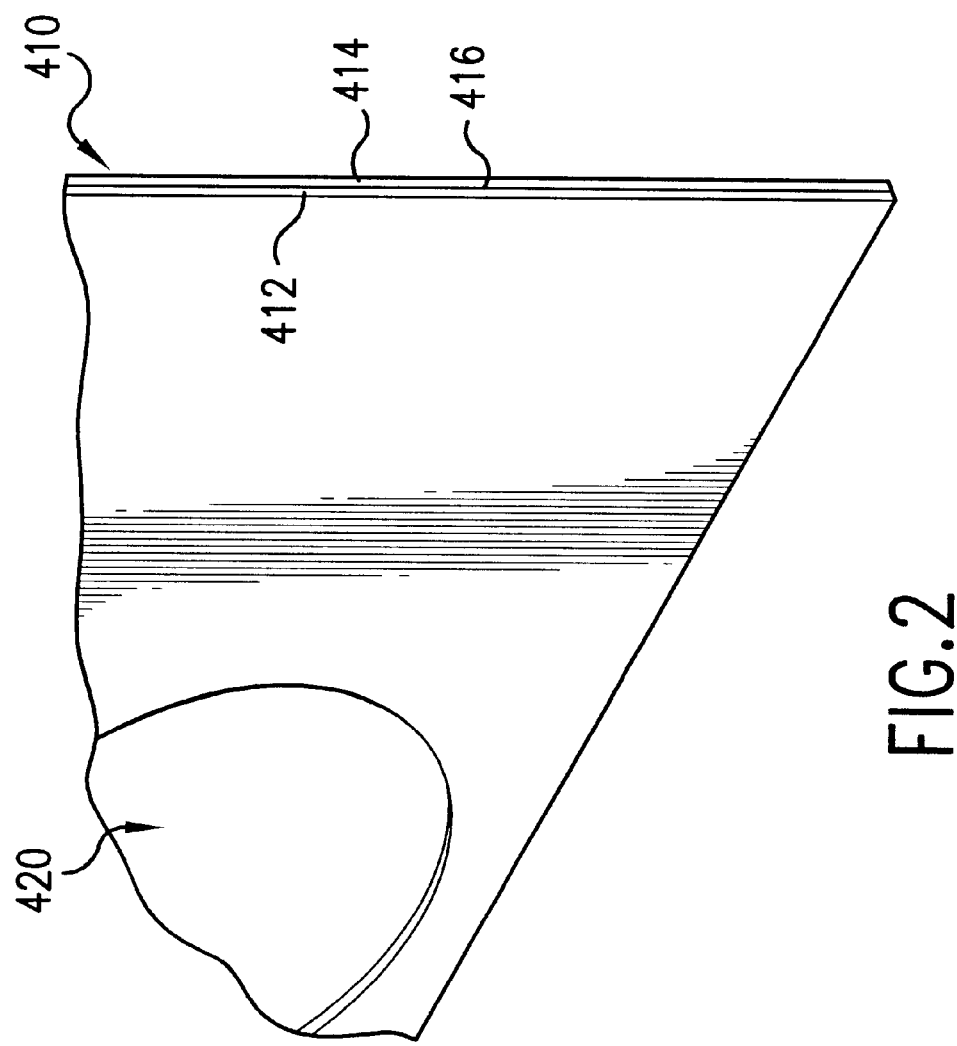
FIG. 2 is a partial-perspective view of a membrane device spacer according to the present invention.

FIG. 2 illustrates the details of the current embodiment of the spacer 410. Typically, the spacer 410 comprises the two spacer layers 412, 414 that generally define the lengths of the two optical cavities of the dual cavity Fabry-Perot filter 100. Generally, these spacer layers 412, 414 are between 10 and 50 microns in thickness to thereby yield similarly sized optical cavities. The center dielectric mirror layer 416 is relatively thinner, typically being a few micrometers to less than one micrometer in thickness.

Figure 3:
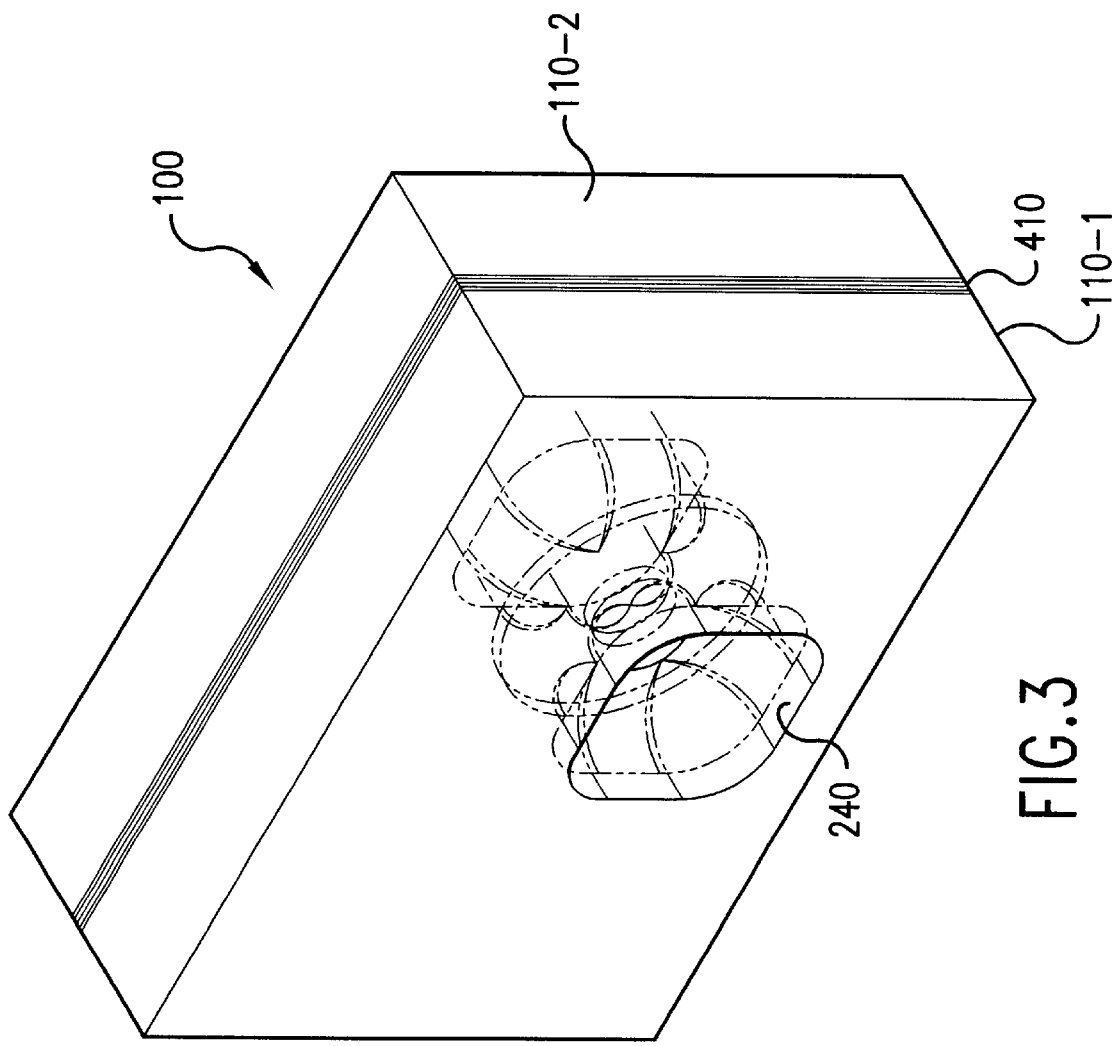
FIG. 3 is a perspective view of the constructed Fabry-Perot filter of the present invention with hidden lines shown in phantom.

FIG. 3 shows the assembled Fabry-Perot filter 100. Specifically, it shows the two membrane devices 110-1, 110-2, which are separated by the intervening spacer 410.

Figure 4:
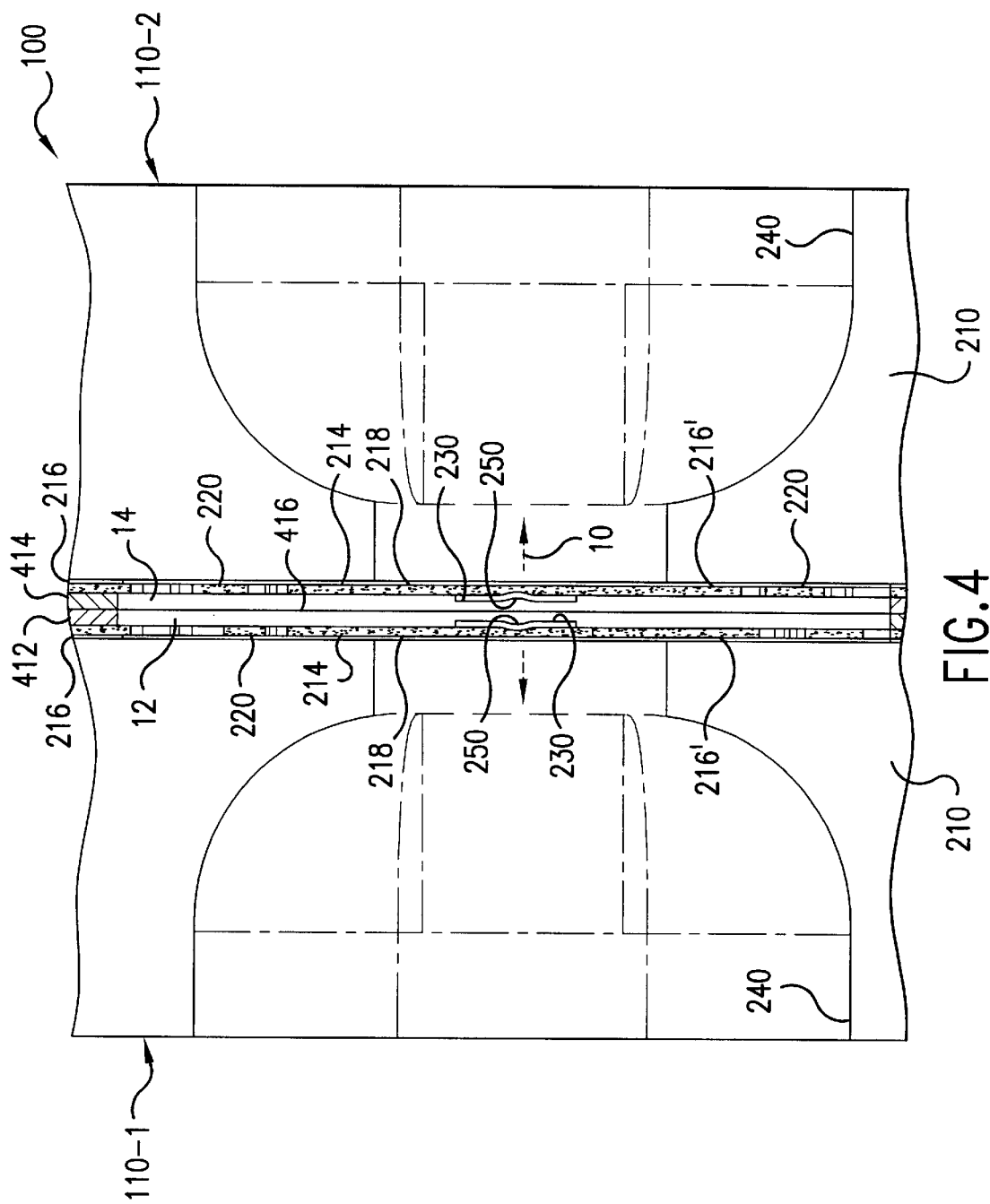
FIG. 4 is a partial side cross-sectional view through the optical axis of the dual cavity Fabry-Perot filter illustrating the operation of the spacer.

FIG. 4 is a partial side cross-sectional view illustrating the relationship between the optical and electrostatic cavities in the constructed FP filter 100.

Specifically, the spacer layers 412, 414 define the two optical cavities 12, 14. The optical cavities 12, 14 extend between the center mirror 416 and the two concave mirror structures 250 that face each other along the optical axis 10.

As described previously, these concave mirrors 250 are formed in their respective membranes 214 using mirror coatings 230 over a curved surface that has been formed in the membrane layer. Deflection of these membranes is achieved via electric fields that are established in their respective electrostatic cavities 216' that are created by the removal of the sacrificial layers 216. Optical access to the respective backsides of each of the membranes 214 is provided by the optical ports 240 that extend through the supports 210 of each membrane devices 110-1, 110-2. The voltage difference between the supports 210 and the respective membranes 214 yields electrostatic deflection of the membranes 214 in the direction of the support and thus into the respective electrostatic cavities 216'. In this way, the optical lengths of each of the optical cavities 12, 14 are independently modulated to thereby provide the tuning function for the Fabry-Perot filter 100. In the current embodiments, the electrostatic cavities are between 3 and 6 microns in length. These distances enable optical tuning across the free spectral range for 1,000 to 2,000 nanometer light, while limiting the actuation voltages required for the membrane.

Fabrication Strategies

Figure 5:
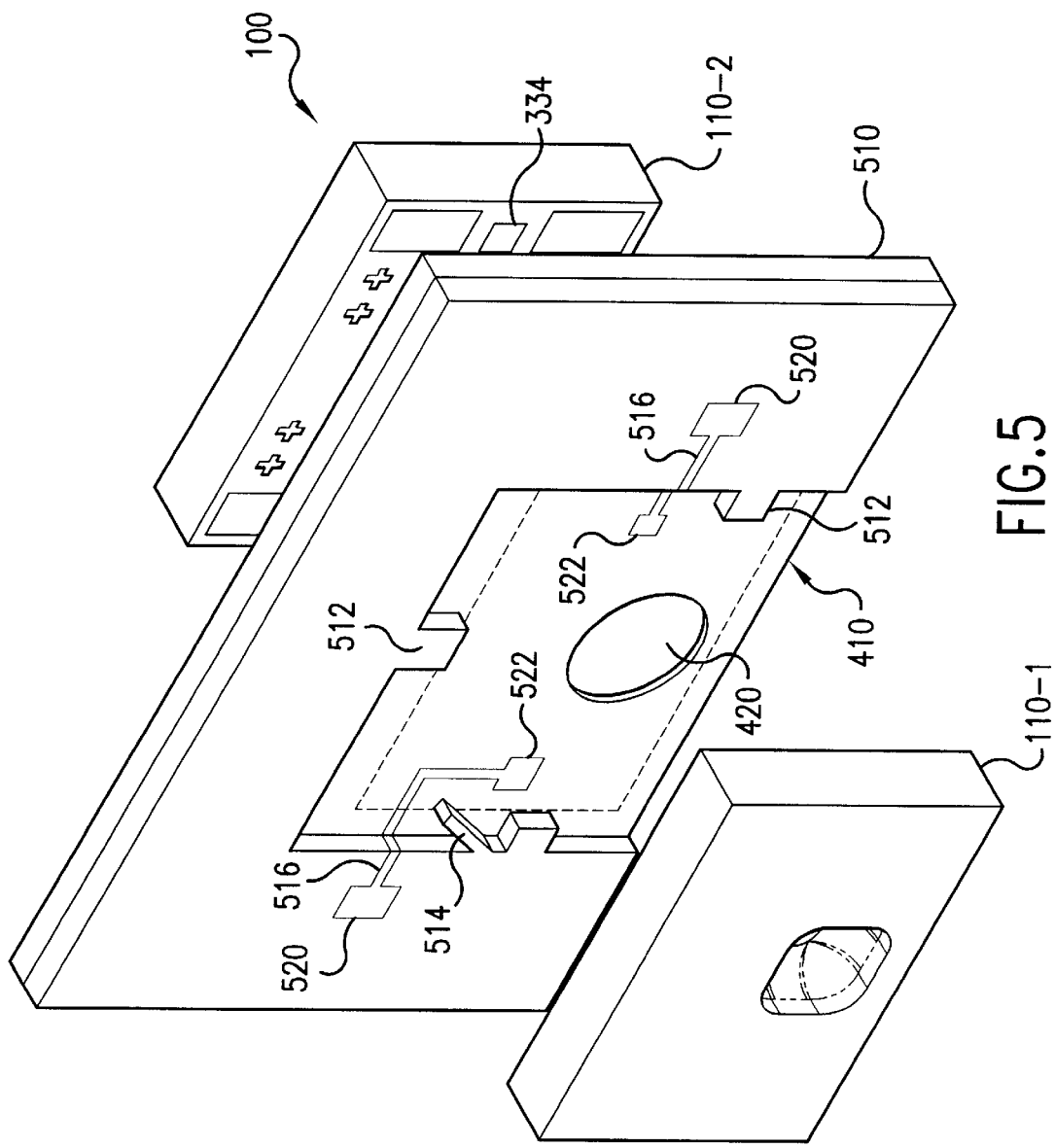
FIG. 5 is an exploded perspective view of another embodiment in which a frame is provided on the spacer to facilitate alignment of the membrane devices and handling of the spacer during fabrication.

FIG. 5 illustrates one strategy for the fabrication and assembly of the tunable filter 100. Specifically, a frame 510 is provided that surrounds the spacer 410. In one implementation, this frame 510 is integral with the spacer 410. Specifically, the spacer 410 is provided as a blind-hole structure that is etched or otherwise fabricated into the frame 510. In one implementation, this is accomplished by deep reactive ion etching (DRIE).

In conjunction with the formation of the blind-hole, registration features 512 are provided, in one implementation, to facilitate the alignment of the membrane device 110-1 into the blind-hole in the frame 510. Spring elements 514 are further provided in some instances to improve the registration or abutment of the membrane device 110-1 against the registration features 512.

The principle objective behind providing the frame 510 is to facilitate the handling of the relatively thin spacer 410. As a result, the blind-holes can be provided on both sides of the frame 510 or one of the membrane devices 110 can be flush mounted whereas the other one can be inserted into a relatively deeper blind-hole.

In the illustrated implementation, the membrane devices 110 have front-side bond pads 336, 334. Metal traces 516 are provided between connection pads 522. Upon assembly, the connected pads 522 electrically contact the respective bond pads 336, 334 of the membrane devices 110 and thereby enable electrical access via wire bond pads 520 on the sides of the frame 510. The traces 516 function as jumpers between the wire bond locations 336, 334 on the membrane devices, which become concealed during assembly, and the bond pads 520 on the spacer 510.

Figure 6:
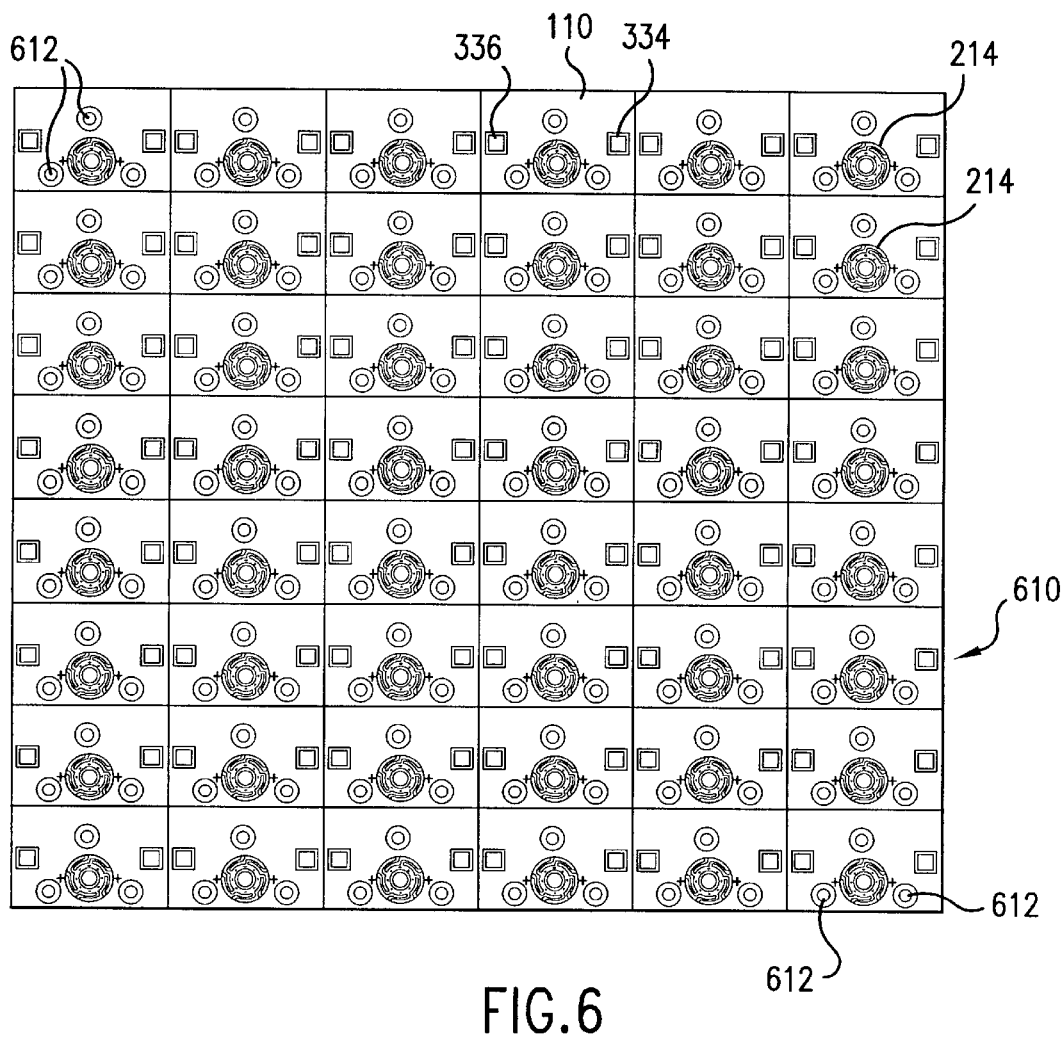
FIG. 6 is a plan view of a die of membrane devices prior to die level assembly.
Figure 7:
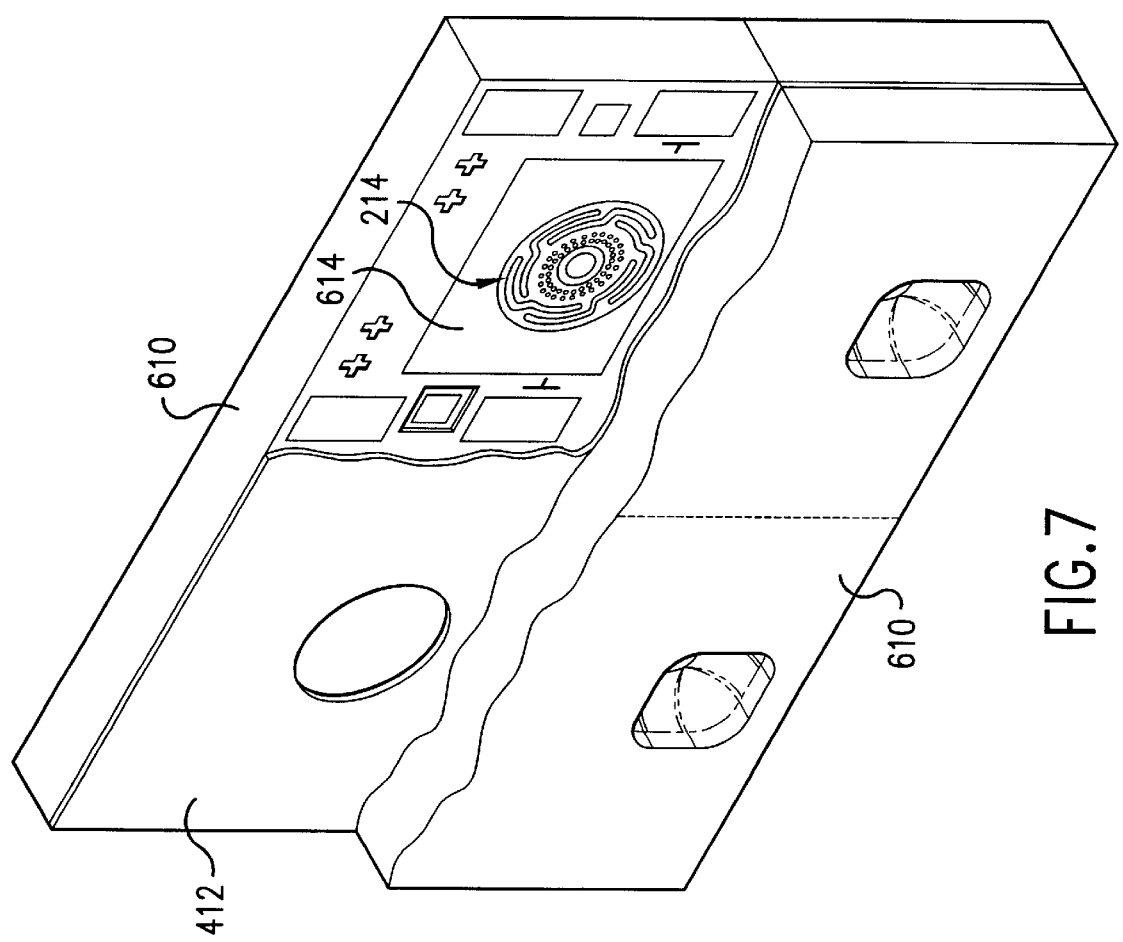
FIG. 7 is a perspective partial cut-away view illustrating the assembly of the membrane device die with the intervening spacer.

Another application/assembly strategy is illustrated in FIGS. 6–8. Generally, these figures illustrate a scheme for wafer or die level assembly.

Specifically, as illustrated in FIG. 6, multiple membrane devices 110 are provided on a single die 610.

Next, as illustrated in FIG. 7, the dies 610 are assembled with the intervening spacer 412.

One difficulty associated with this die level fabrication is the difficulty in handling the relatively thin spacer 412. In one embodiment, a precursor spacer is bonded to one of the dies 610; the spacer layer adjoining the die 610 is of the desired thickness. The other spacer layer is then polished back to the desired thickness. This allows assembly using a more mechanically robust spacer, while still achieving the desirable optical cavity size.

Under current embodiments, the dies are metal bonded to each other. Specifically, ball bump metalizations 612, as illustrated in FIG. 6, or thick metal depositions can be used.

In an alternative embodiment, larger metalizations are used as illustrated by reference numeral 614 in FIG. 7. Preferably, these metalizations are continuous around an entire perimeter of the membrane 214. This pattern has the effect of sealing the optical cavity. As a result, as illustrated in FIG. 8, when the optical filters 100 are separated by, for example, die sawing along lines 620, slurry from the sawing process does not enter and contaminate the optical cavities. Moreover, to completely protect the MEMS devices during the die saw process, the optical ports 240 are also preferably filled prior to die saw. In one example, the fill material is photoresist. When the die saw process is completed and the tunable filters 100 are fully singulated, the photoresist fill is removed in a circulated acetone bath, for example.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multi-cavity Fabry-Perot filter, comprising
   a first electrostatically deflectable membrane device;
   a first curved mirror structure on the first membrane device;
   a second electrostatically deflectable membrane device;
   a second curved mirror structure on the second membrane device;
   a spacer separating the first membrane device from the second membrane device; and
   a flat mirror supported by the spacer between the first curved mirror structure and the second curved mirror structure.

2. A filter as claimed in claim 1, wherein each of the first and second membrane devices comprises:
   a support;
   a device layer in which a deflectable membrane is formed;
   a sacrificial layer separating the support from the device layer, the sacrificial layer being selectively removed to release the membrane; and
   an optically curved surface on the deflectable membrane.

3. A filter as claimed in claim 2, wherein each of the first and second membrane devices further comprises an optical coating on the optically curved surface.

4. An optical membrane device as claimed in claim 3, wherein the optical coating is a multilayer dielectric mirror.

5. A filter as claimed in claim 1, wherein the flat mirror comprises a suspended multilayer dielectric mirror coating.

6. An optical membrane device as claimed in claim 2, wherein the sacrificial layer defines an electrical cavity across which electrical fields are established to deflect the membrane structure in a direction of the support.

7. A filter as claimed in claim 1, wherein a membrane of each of the first and second membrane devices comprises:
   a center body portion;
   an outer portion, which is at least partially supported by a sacrificial layer; and
   tethers that extend between the center body portion and the outer portion.

8. A filter as claimed in claim 1, wherein the spacer comprises first and second spacer layers sandwiching a dielectric mirror layer that functions as the flat mirror.

9. A filter as claimed in claim 1, wherein regions of the first and second spacer layers are removed surrounding an optical axis to expose the dielectric mirror layer of the flat mirror.

10. A filter as claimed in claim 1, further comprising a support frame that is integral with the spacer.

11. A filter as claimed in claim 1, further comprising a support frame having two opposed blind holes, into which the first membrane device and the second membrane device are installed.

12. A filter as claimed in claim 1, wherein the spacer comprises registration features that engage at least one of the membrane devices to align the membrane devices relative to each other.

* * * * *